United States Patent [19]
Perks

[11] Patent Number: 5,924,102
[45] Date of Patent: Jul. 13, 1999

[54] SYSTEM AND METHOD FOR MANAGING CRITICAL FILES

[75] Inventor: Michael Albert Perks, Austin, Tex.

[73] Assignee: International Business Machines Corporation, Armonk, N.Y.

[21] Appl. No.: 08/852,777

[22] Filed: May 7, 1997

[51] Int. Cl.$^6$ .................................................. G06F 17/30
[52] U.S. Cl. ........................................................ 707/200
[58] Field of Search ............................................ 707/200

[56] References Cited

U.S. PATENT DOCUMENTS

| | | | |
|---|---|---|---|
| 5,313,646 | 5/1994 | Hendricks et al. | 707/101 |
| 5,448,045 | 9/1995 | Clark | 235/382 |
| 5,471,615 | 11/1995 | Amatsu et al. | 395/200.32 |
| 5,638,509 | 6/1997 | Dunphy et al. | 395/182.18 |

*Primary Examiner*—Maria N. Von Buhr
*Attorney, Agent, or Firm*—Leslie A. Van Leeuwen

[57] ABSTRACT

A system and method for managing critical files in an information handling system. Critical files are those files which are difficult to recover after a system failure, hard disk reformat, or user error. The critical file management system of the present invention includes a critical file manager, which can be accessed by programs through an application programming interface (API). Programs call the API to register and unregister critical files. A user interface is also provided. The user interface allows users to register and unregister critical files, and also allows users to view a list of all critical files and versions, along with the name of the program or user which added each critical file to the list. Users may also request a backup or restore of one, several, or all critical files at any time. A database of critical files, including a version for each file, is maintained. Backup copies of each critical file are stored in a critical file storage. At predetermined times, such as system shutdown or boot, the critical files are backed up. The critical file management system may also automatically restore all critical files at predetermined times, such as every time the information handling system is started.

24 Claims, 4 Drawing Sheets

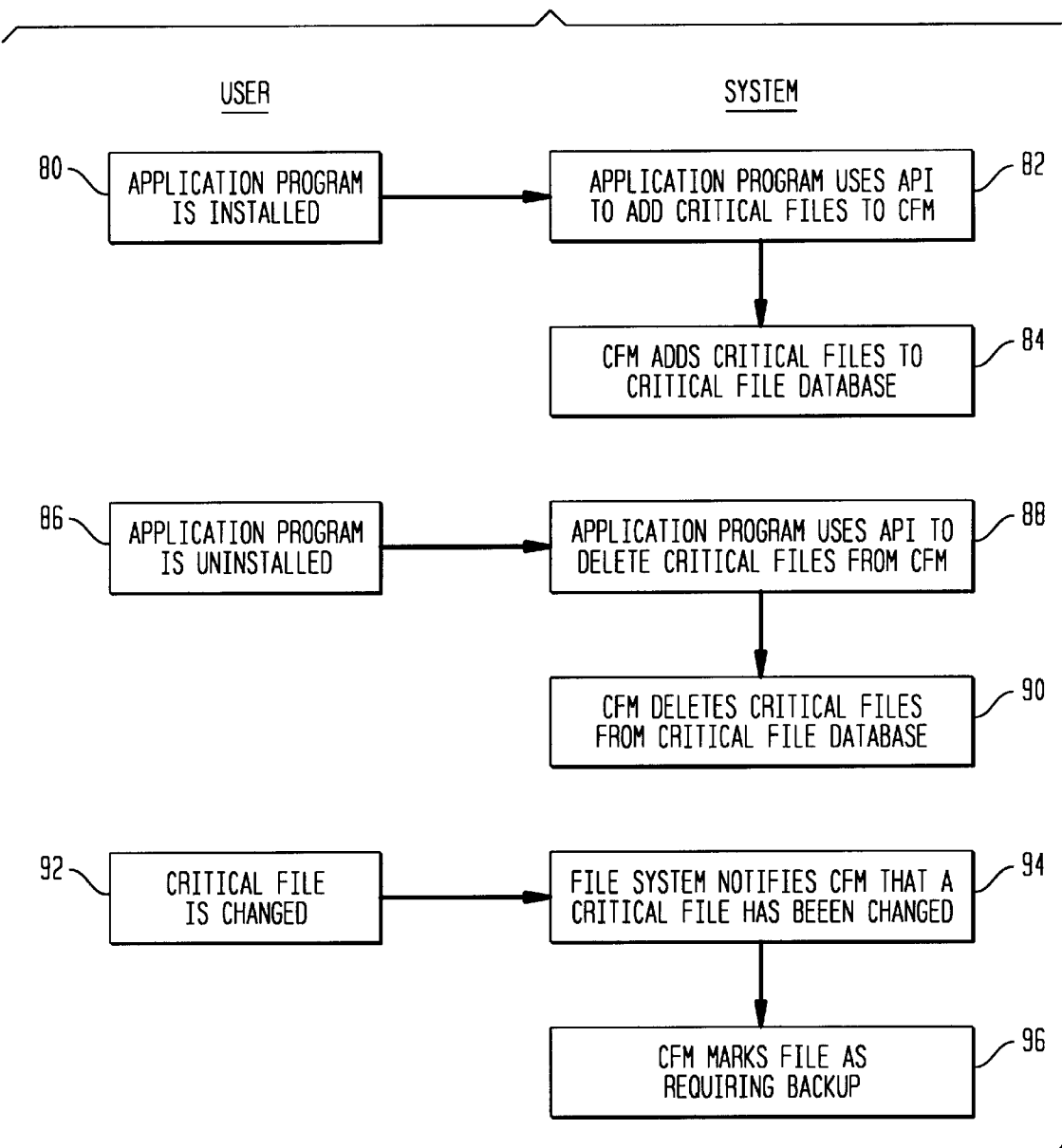

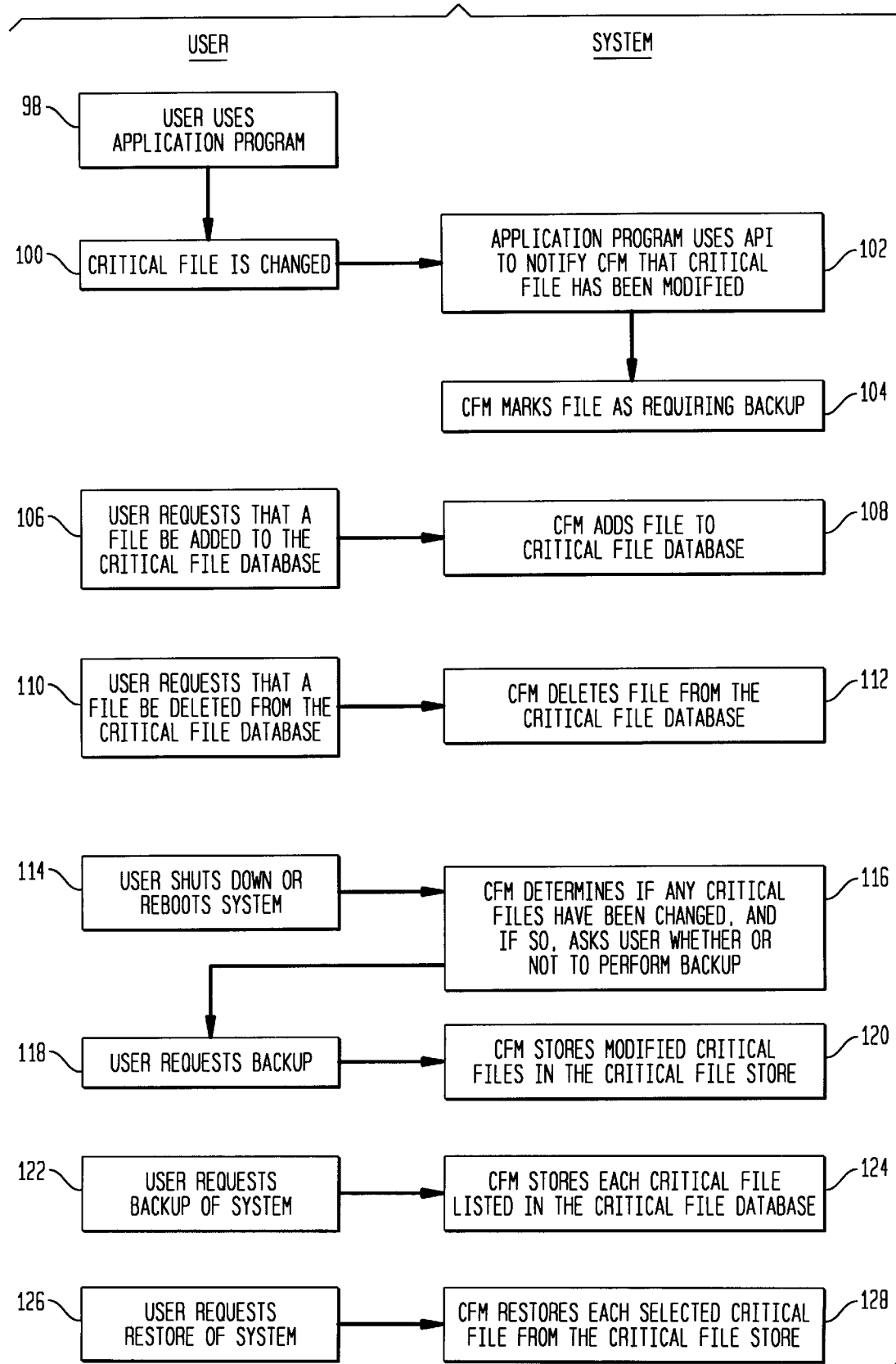

SYSTEM AND METHOD FOR MANAGING CRITICAL FILES

FIELD OF THE INVENTION

The present invention relates to the field of information handling systems, and, more particularly, to a system and method for managing critical files within an information handling system.

BACKGROUND OF THE INVENTION

Information handling systems are becoming increasingly complex and difficult both to set up and restore. When a user is forced to recreate some or all of a system because of a system crash, hard disk failure, or user error, the task is often time-consuming and complex.

Prior art methods for backing up and restoring an information handling system typically involve backing up the entire system on a regular basis. The system is usually backed up to diskettes, a tape, or a secondary hard disk. However, there are several problems with this prior art backup and restore method. Backing up the entire information handling system can take a long time and consume a large amount of storage. Many of the files which are backed up do not necessarily have to be saved, as many of these files are part of software packages which can easily be reinstalled from the user's copy of the software package. In addition, even if a recent backup copy of the information handling system is available, it is not necessarily the latest copy.

Some software packages provide a method for backing up user data files. These software packages prompt the user to backup data files on a regular basis. However, the disadvantage of this prior art approach is that the only files saved are those data files that belong to the particular software application. A further disadvantage of this prior art approach is that application programs often back up only user data, and do not back up configuration data. One piece of configuration data frequently ignored (i.e. not backup up) by application programs is the configuration file which describes the components of the application which are installed. If this data were to be saved, then if the user needed to reinstall the application, the user would not have to go through a laborious setup process, trying to remember the previous configuration.

Consequently, it would be desirable to have a system and method to manage and back up those critical files which are difficult to recover after an event such as a system crash or hard disk failure. It would also be desirable if the system and method were easy to use, and did not take a significant amount of time or system resources.

SUMMARY OF THE INVENTION

Accordingly, the present invention provides a system and method for managing critical files in an information handling system. Critical files are those files which are difficult to recover after a system failure, hard disk reformat, or user error. Typically, critical files include configuration files, setup files, and user data files.

The critical file management system of the present invention includes a critical file manager, which can be accessed by programs through an application programming interface (API). Programs call the API to register and unregister critical files. A user interface is also provided. The user interface allows users to register and unregister critical files, and also allows users to view a list of all critical files and versions, along with the name of the program or user which added each critical file to the list. Users may also request a backup or restore of one, several, or all critical files at any time.

A database of critical files, including a version for each file, is maintained. Backup copies of each critical file are stored in a critical file storage. At predetermined times, such as system shutdown or boot, the critical files are backed up. The critical file management system may also automatically restore all critical files at predetermined times, such as every time the information handling system is started.

When a user modifies a critical file, the information handling system's file system notifies the critical file manager. If a critical file is modified by a program, the program uses the API to notify the critical file manager of the modification. In either case, the critical file manager marks the particular critical file as requiring backup. If requested, security features may be implemented which will prohibit certain users or programs from modifying certain critical files.

One of the embodiments of the invention is as sets of instructions resident in an information handling system.

An advantage of the present invention is that critical files are easily maintained and backed up, without requiring a large amount of time or a large amount of system resources. Another advantage of the present invention is that in the event of a system failure or other problem, critical files may be easily and quickly restored.

BRIEF DESCRIPTION OF THE DRAWINGS

The foregoing and other features and advantages of the present invention will become more apparent from the detailed description of the best mode for carrying out the invention as rendered below. In the description to follow, reference will be made to the accompanying drawings, where like reference numerals are used to identify like parts in the various views and in which:

FIGS. 3A and 3B are flow charts depicting user actions, and corresponding responses by the critical file management system of the present invention.

DETAILED DESCRIPTION OF A PREFERRED EMBODIMENT OF THE INVENTION

Figure 1:
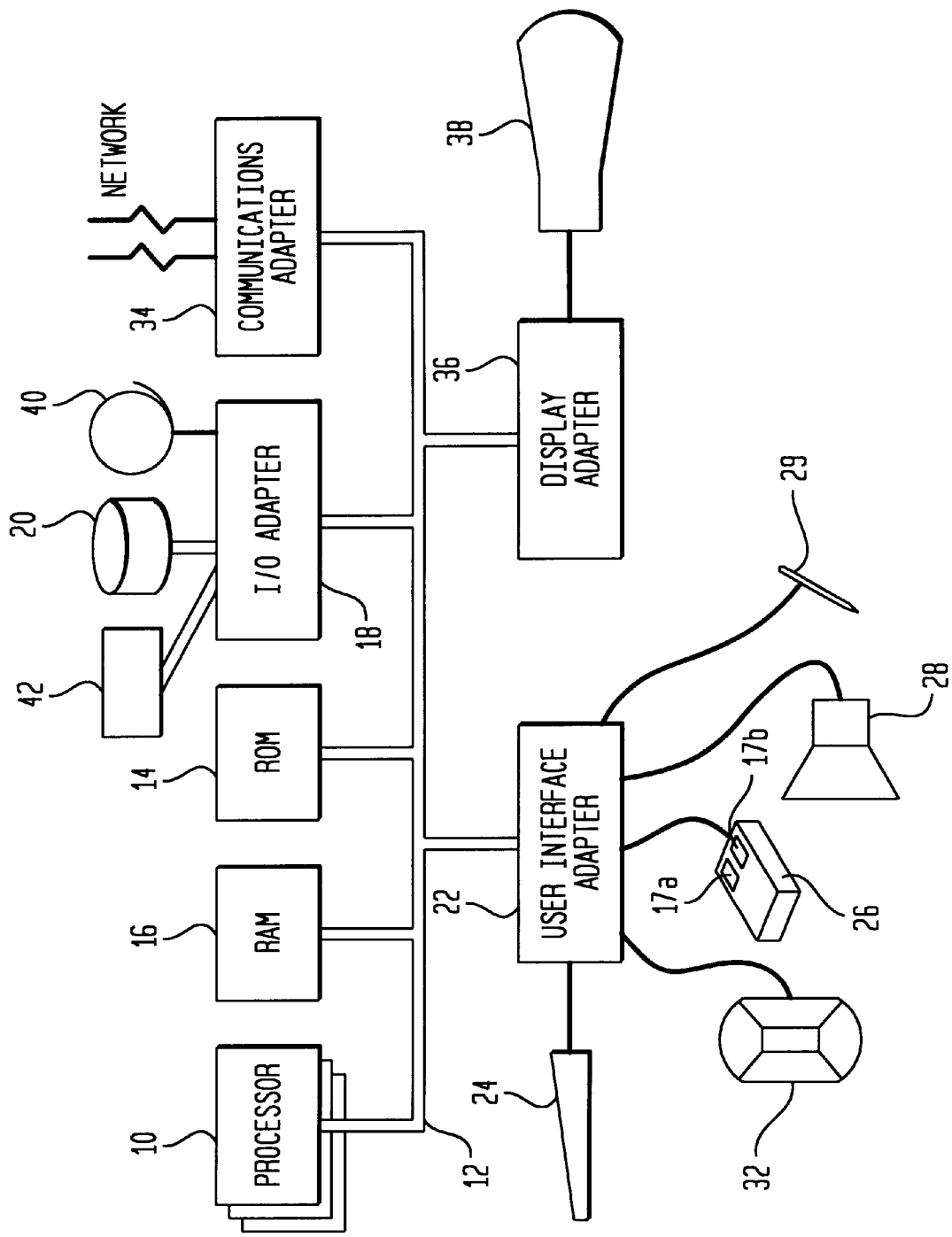
FIG. 1 is a block diagram of an information handling system capable of executing the critical file management method of the present invention.

The invention may be implemented on a variety of hardware platforms, including personal computers, workstations, minicomputers, and mainframe computers. Many of the steps of the method of the present invention may be advantageously implemented on parallel processors of various types. Referring now to FIG. 1, a typical configuration of an information handling system that may be used to practice the novel method of the present invention will be described. The computer system of FIG. 1 has at least one processor 10. Processor 10 is interconnected via system bus 12 to random access memory (RAM) 16, read only memory (ROM) 14, and input/output (I/O) adapter 18 for connecting peripheral devices such as disk units 20, tape drives 40, and printers 42 to bus 12, user interface adapter 22 for connecting keyboard 24, mouse 26 having buttons 17a and 17b, speaker 28, microphone 32, and/or other user interface devices such as a touch screen device 29 to bus 12, communication adapter 34 for connecting the information handling system to a data processing network, and display adapter 36 for connecting bus 12 to display device 38. Communication adaptor 34 may link the system depicted in FIG. 1 with hundreds or even thousands of similar systems, or other devices, such as remote printers, remote servers, or remote storage units.

Critical files are those files that are difficult to recover after a system crash, disk reformat, or application re-install. Typically, critical files contain configuration data, setup information, or critical user data. Application executables, for example, are not critical files, as they can be retrieved by re-installing the application program.

Many operating systems try to centralize data in some common files. As an example, if an information handling system is using OS/2 (OS/2 is a trademark of International Business Machines Corporation) as its operating system, the following files are considered critical files:

OS2SYS.INI
OS2.INI
CONFIG.SYS
AUTOEXEC.BAT
STARTUP.CMD

If an information handling system is using Windows 95 (Windows 95 is a trademark of Microsoft Corporation) as its operating system, SYSTEM.DAT and USER.DAT may be considered critical files.

Most application programs create application-specific configuration and setup files. For example, Microsoft Word (Microsoft Word is a trademark of Microsoft Corporation) uses .DOT files to store templates. Application programs may also generate data files which can be considered critical files. For example, a financial application program may contain several user data files which are critical. If, for some reason, the financial application were to be re-installed, the application executable could be easily obtained from the original source of the application program (i.e. diskettes, CD-ROM, or via the Internet). However, a particular user's financial data would be lost if the data were not backed up.

Figure 2:
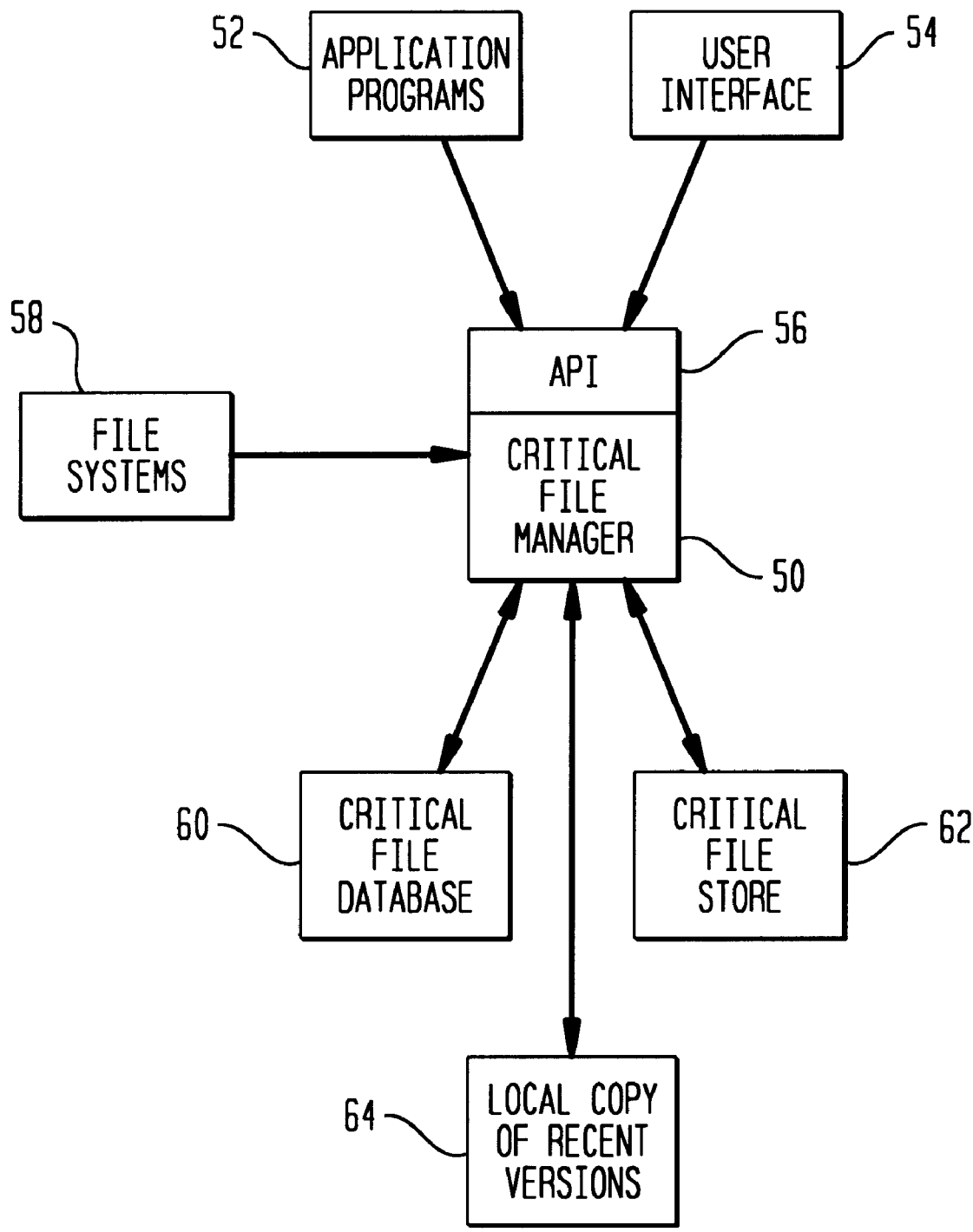
FIG. 2 is a block diagram depicting the components of the critical file management system of the present invention.

The critical file management system and method of the present invention provides a system-wide tool which can be used to backup, manage, and restore critical files in an information handling system. Referring now to FIG. 2, the components of a critical file management system will now be described.

As shown in FIG. 2, the hub of the critical file management system is critical file manager (CFM) 50. CFM 50 may be accessed by application programs 52, or by users via user interface 54, through an application programming interface (API) 56. File system 58 also interfaces with CFM 50 through a notification system.

CFM 50 maintains a database of critical files 60. Naturally, database 60 is also a critical file. Database 60 contains the name and version of each critical file. Note that more than one version of a critical file may be listed in database 60, and thus is managed by CFM 50. All critical files, including all versions, listed in database 60 are backed up to critical file store 62. Critical file store 62 may be any type of backup storage, such as a diskette, tape, CD-ROM, alternate hard drive, or even a network file stored on a server. Critical file store 62 may also be distributed among more than one storage areas. For example, a user may choose to store several versions of a critical file on the user's hard disk, and other versions of the same critical file on a diskette. In addition, a user may choose to store recent versions of critical files in a separate "local copy" file 64. This could be useful in the case where a user inadvertently changes a critical file and wants to be able to quickly and easily retrieve and reinstall the most recent version of the critical file.

Critical files are backed up regularly at a predetermined time. For example, CFM 50 may initiate a critical file backup every time the information handling system is started, restarted, or shut down. Because critical files are defined to be only those files which are difficult to recreate (i.e. application specific configuration and setup files, and user data files), it is anticipated that the amount of data backed up during a critical file backup will be considerably less than the amount of data backed up in a full system backup. In addition, CFM 50 may automatically restore all critical files every time the system is started.

When an application program 52 is installed, it may register critical files with CFM 50 through the use of API 56. For example, a financial application program would register user data files (i.e. all files of a particular type, such as all files that end with .DAT) as critical files. The application program 52 may use API 56 to call CFM 50 several times to register different critical files, such as configuration and setup files. Application programs 52 may also provide an option to allow users to install their own versions of critical files to override the defaults provided by the application. This option may be useful for a system administrator to set up standard configurations. This option may also be useful when a user desires to reinstall an application program. Similarly, when an application program 52 is uninstalled, it may unregister critical files with CFM 50 by using API 56.

As application programs 52 execute, they may also use API 56 to notify CFM 50 that a critical file has been modified. CFM 50 notes the modification in critical file database 60. For example, if a user changes options in a word processing application, the word processing application would update the appropriate configuration file and then use API 56 to notify CFM 50 that a critical file has been modified. When CFM 50 initiates a critical file backup (as described above), only those critical files which have been modified since the last backup need to be rewritten to critical file store 62.

Users may also use API 56 to request that CFM 50 add or delete critical files from critical file database 60. In addition to allowing users to add and delete critical files from critical file database 60, user interface 54 also allows users to list critical file database 60, along with which program or user added each critical file to critical file database 60. User interface 54 also allows a user to perform a backup or restore of one, several, or all critical files, including critical file database 60.

The information handling system's file system 58 also interfaces with CFM 50. There may be application programs which do not notify CFM 50 when a critical file is modified. Also, users may be able to modify and/or delete critical files without going through an application program. In these cases, file system 58 notifies CFM 50 that a critical file has been modified or deleted. File system 58 may also be designed so that users or application programs are prevented from deleting critical files. Additional security attributes can be added so that only certain users or application programs can modify critical files, or particular critical files. For example, application "X" can be prevented from modifying critical file "y" that belongs to application "Y" unless the appropriate security key is provided.

Referring now to FIGS. 3A and 3B, a flow chart showing user actions and corresponding system actions will be described. When a user installs an application program (step 80), the application program uses API 56 to notify CFM 50 of the application program's critical files (step 82). CFM 50 then adds the critical files to critical file database 60 (step 84). Similarly, when a user uninstalls an application program (step 86), the application program uses API 56 to tell CFM 50 to delete any critical files from the critical file management system (step 88). CFM 50 then deletes the critical files from critical file database 60 (step 90).

When a user modifies a critical file (step 92), the information handling system's file system notifies CFM 50 that a critical file has been changed (step 94). CFM 50 then marks the file in critical file database 60 as a file requiring backup (step 96). If a user modifies a critical file while working within an application program (steps 98 and 100), the application program uses API 56 to notify CFM 50 that a critical file has been changed (step 102). CFM 50 then marks the file in critical file database 60 as a file requiring backup (step 104). As discussed above, security measures may be added to the system to prevent a user from modifying a particular file or files.

A user may use user interface 54 to request that a file be added to critical file database 60 (step 106). In this case, CFM 50 adds the file to critical file database 60 (step 108). Similarly, a user may use user interface 54 to request that a file be deleted from critical file database 60 (step 110). In this case, CFM 50 deletes the file from critical file database 60 (step 112).

At certain times, CFM 50 will backup critical files. For example, when a user shuts down or reboots the system (step 114), CFM 50 determines if any critical files have been marked as requiring modification (step 116). If so, CFM 50 will ask the user whether or not a critical file backup should be performed. If the user requests a critical file backup at this time (step 118), CFM 50 stores any modified critical files in critical file store 62 (step 120). Also, if the user has requested that the most recent copy of each critical file be stored in local copy 64, CFM 50 will also copy the newest version of critical files to local copy 64.

The user may also request a critical file backup at any time (step 122), and CFM 50 will perform the backup (step 124). Also, the user may request a critical file restore at any time (step 126), and CFM 50 will restore each selected critical file from critical file store 62 (step 128), or from local copy 64. Note that in step 126 a user may request that one, several, or all critical files be restored.

Although the invention has been described with a certain degree of particularity, it should be recognized that elements thereof may be altered by persons skilled in the art without departing from the spirit and scope of the invention. One of the embodiments of the invention can be implemented as sets of instructions resident in the random access memory 16 of one or more computer systems configured generally as described in FIG. 1. Until required by the computer system, the set of instructions may be stored in another computer readable memory, for example in a hard disk drive, or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, when desired by the user. One skilled in the art would appreciate that the physical storage of the sets of instructions physically changes the medium upon which it is stored electrically, magnetically, or chemically so that the medium carries computer readable information. The invention is limited only by the following claims and their equivalents.

What is claimed is:

1. An information handling system comprising:
   one or more processors;
   input/output means for communicating information to and from one or more peripheral devices;
   memory means for storing instructions and data for use by said processors;
   one or more images of an operating system for controlling the operation of said processors;
   at least one system bus connecting the elements of the system for efficient operation;
   one or more programs executing in said processors; and
   a critical file management system, comprising:
      a critical file manager;
      means for storing one or more critical files in a critical file storage memory means;
      means for each program to identify one or more program files as critical files to said critical file manager; and
      means for each program to notify said critical file manager whenever one or more of the program files identified as critical files is modified.

2. An information handling system according to claim 1, further comprising means for each program to delete one or more of the program files identified as critical files from said critical file management system.

3. An information handling system according to claim 1, further comprising means for maintaining a list of all critical files.

4. An information handling system according to claim 3, wherein said means for maintaining a list of all critical files comprises a critical file database.

5. An information handling system according to claim 1, further comprising means for backing up one or more critical files.

6. An information handling system according to claim 1, further comprising means for restoring one or more critical files.

7. A critical file management system comprising:
   a critical file manager;
   means for storing one or more critical files in a critical file storage memory means;
   means for a program to identify one or more program files as critical files to said critical file manager; and
   means for the program to notify said critical file manager whenever one or more of the program files identified as critical files is modified.

8. A critical file management system according to claim 7, further comprising means for the program to delete one or more of the program files identified as critical files from said critical file management system.

9. A critical file management system according to claim 9, further comprising means for maintaining a list of all critical files.

10. A critical file management system according to claim 9, wherein said means for maintaining a list of all critical files comprises a critical file database.

11. A critical file management system according to claim 7, further comprising means for backing up one or more critical files.

12. A critical file management system according to claim 7, further comprising means for restoring one or more critical files.

13. A method for managing critical files in an information handling system, comprising the steps of:
   storing one or more critical files in a critical file storage memory means;
   identifying, by a program executing in the information handling system, one or more program files as critical files to a critical file manager;
   notifying, by the program, the critical file manager whenever one or more of the program files identified as critical files is modified.

14. A method according to claim 13, further comprising the step of deleting, by the program, one or more of the program files identified as critical files from said critical file management system.

15. A method according to claim 13, further comprising the step of maintaining a list of all critical files.

16. A method according to claim 15, wherein said maintaining step comprises storing the list of critical files in a critical file database.

17. A method according to claim 13, further comprising the step of backing up one or more critical files.

18. A method according to claim 13, further comprising the step of restoring one or more critical files.

19. A computer-readable medium for managing critical files in an information handling system, comprising:
   a critical file manager;
   means for storing one or more critical files in a critical file storage memory means;
   means for a program executing in the information handling system to identify one or more program files as critical files to said critical file manager; and
   means for the program to notify said critical file manager whenever one or more of the program files identified as critical files is modified.

20. A computer-readable medium according to claim 19, further comprising means for the program to delete one or more of the program files identified as critical files from said critical file management system.

21. A computer-readable medium according to claim 19, further comprising means for maintaining a list of all critical files.

22. A computer-readable medium according to claim 21, wherein said means for maintaining a list of all critical files comprises a critical file database.

23. A computer-readable medium according to claim 19, further comprising means for backing up one or more critical files.

24. A computer-readable medium according to claim 19, further comprising means for restoring one or more critical files.

* * * * *